United States Patent [19]

Kawakami et al.

[11] Patent Number: 4,822,844

[45] Date of Patent: Apr. 18, 1989

[54] RUBBER COMPOSITIONS

[75] Inventors: Kinya Kawakami, Kanagawa; Takao Muraki, Hiratsuka, both of Japan

[73] Assignee: The Yokohama Rubber Co., Ltd., Tokyo, Japan

[21] Appl. No.: 157,978

[22] Filed: Feb. 19, 1988

[51] Int. Cl.$^4$ .......................... C08K 3/04; C08L 7/00; C08L 9/00; C08L 9/06

[52] U.S. Cl. ................... 524/496; 524/495; 525/237

[58] Field of Search ................ 524/495, 496; 525/237

[56] References Cited

U.S. PATENT DOCUMENTS

| | | | |
|---|---|---|---|
| 4,433,094 | 2/1984 | Ogawa et al. | 524/496 |
| 4,478,973 | 10/1984 | Misono et al. | 534/496 |
| 4,500,672 | 2/1985 | Suzuki et al. | 524/496 |
| 4,548,980 | 10/1985 | Nagata et al. | 534/495 |
| 4,703,079 | 10/1987 | Ahmad et al. | 524/495 |
| 4,732,927 | 3/1988 | Ida et al. | 524/495 |

*Primary Examiner*—Allan M. Lieberman
*Attorney, Agent, or Firm*—Finnegan, Henderson, Farabow, Garrett & Dunner

[57] ABSTRACT

Rubber compositions particularly for use in automobile tire treads comprise a selected class of starting rubbers and specified amounts of a selected types of carbon black, this filler having specified values of IA, $N_2SA/IA$ and $\Delta D_{50}$ (Dst). The resulting tire excels in abrasion resistance, rebound resilience, antiskidding on wet, snowy and icy roads and fuel economy thus contributing to efficient and safe driving in all seasons.

4 Claims, No Drawings

RUBBER COMPOSITIONS

BACKGROUND OF THE INVENTION

1. Field of the Invention

This invention relates to rubber compositions suitable particularly for use in automotive tire treads.

2. Description of the Prior Art

Industrial attention is directed to resource and energy saving. To cope with this trend, automobile tire manufacturers have made research efforts to develop high-quality, fuel-saving tires.

Carbon black is well known as an important filler to reinforce rubbers. Its physical characteristics are determinable by the specific surface area on $I_2$ or BET adsorption and also by the carbon structure on DBP adsorption.

Improved abrasion resistance and reduced heat buildup are essentially required of carbon black-filled rubber compositions for use in tire treads. The filler if larger in surface area or if denser in carbon structure would render the resulting tire highly immune to heat development but less resistant to abrasive wear.

In general, automobile tires are susceptible to hysteresis loss mostly at their tread portions. Certain hysteresis-resistant rubbers have been proposed to compensate for this problem, and they include natural rubber, synthetic isoprene rubber, butadiene rubber and low glass transition styrene-butadiene rubber and their blends. Common additives are carbon black of a relatively coarse particle size and softeners of an aromatic oily type but in limited quantities. The prior hysteresis-resistant rubbers, though economical of fuel, are satisfactory from the functional point of view. Too coarse carbon black would fail to give improved resistance to wet skid and to abrasive wear. Less softeners would invite excessive rigidity, hence serious skin on snowy and icy roads.

With both fuel economy and skid resistance in view, other types of butadiene rubber and styrene-butadiene rubber have also been proposed which have a 1,2-vinyl bonds content greater than 50%. Such vinyl-rich rubbers, however, undergo glass transition at relatively high temperatures and thus would make the tire severely abrasive and too rigid and skiddy on snow and ice. This leaves the problem that the driver will have to replace his car tires with spiked or studded tires, which is literally tedious and time-consuming.

SUMMARY OF THE INVENTION

It is the primary object of the present invention to provide improved rubber compositions chiefly for use in tire treads which will exhibit excellent resistance to abrasive wear and to wet, snowy and ice skid, and satisfactory fuel economy without involving objectionable heat development during tire running, thus ensuring efficient and safe driving in all seasons.

The rubber composition according to the invention may be applied to tire treads for various vehicles such as passenger cars, buses, trucks and the like. This composition is also useful, where desired, for tire sidewalls, industrial belts and hoses.

According to an aspect of the invention, a rubber composition comprises (a) a starting rubber comprising at least one of natural rubber and a synthetic rubber, and (b) carbon black in an amount of 20-200 parts by weight based on 100 parts by weight of the starting rubber, the carbon black having an iodine adsorption of 60-70, a specific surface area ratio of nitrogen adsorption to iodine adsorption of 1.18-1.40 and a median width of Stokers' particle size distribution of 70-130 millimicrons.

In another aspect of the invention, a rubber composition comprises (a) a starting rubber comprising 20-80 parts by weight of at least one of natural rubber and polyisoprene rubber, and 80-20 parts by weight of styrene-butadiene rubber having a styrene bond of 10-30 percent by weight and a 1,2-vinyl bond of 10-80 percent by weight, the total amount of the starting rubber being 100 parts by weight, the styrene-butadiene rubber containing either in the molecular chain or at the terminal chain at least one atomic group of the formula

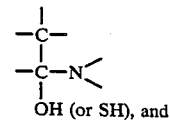

OH (or SH), and (b) carbon black in an amount of 30-80 parts by weight of the total starting rubber, the carbon black having an iodine adsorption of 60-70, a specific surface area ratio of nitrogen adsorption to iodine adsorption of 1.18-1.40 and a median width of Stokes' particle size distribution of 70-130 millimicrons.

DESCRIPTION OF THE PREFERRED EMBODIMENTS

In accordance with a first preferred embodiment of the present invention, eligible starting rubbers include natural rubber (NR) and synthetic rubbers and their blends. These synthetic rubbers may be selected from rubbers commonly employed to produce tires, belts and hoses and including for example styrene-butadiene rubber (SBR), butadiene rubber (BR), polyisoprene rubber (IR), butyl rubber (IIR) and the like.

Carbon black useful as a reinforcing filler should have an IA in the range of 60-70, an $N_2SA/IA$ in the range of 1.18-1.40 and a $\Delta D_{50}(Dst)$ in the range of 70-130 m$\mu$.

IA is known as the specific surface area of carbon black determined by iodine adsorption. The filler if smaller IA than 60 would result in a tire of inadequate abrasion resistance and if larger IA than 70 would lead to increased heat buildup and hence reduced rebound resilience and reduced fuel saving.

$N_2SA/IA$ represents the specific surface area determined by nitrogen adsorption as against that by iodine adsorption, this ratio being taken as a measure for the magnitude of surface activity of carbon black. The larger ratio, the more strongly the filler interacts with a starting rubber and improves tensile stress, rebound resilience and abrasion resistance. The filler if smaller ratios than 1.18 would fail to give sufficient resistance to abrasion and to heat development and if larger ratios than 1.40 would become rather difficult to granulate and less compatible with a starting rubber.

$\Delta D_{50}(Dst)$ is correlative with the median width of Stokes' particle size distribution of carbon black. Sharp plotting is defined acceptable in abrasion resistance but susceptible to heat development, whereas broad plotting is less resistant to abrasive wear. Smaller $\Delta D_{50}(Dst)$ than 70 m$\mu$ would lead to increased heat development, and larger $\Delta D_{50}(Dst)$ would result in reduced abrasion resistance.

The amount of carbon black to be used should be in the range of 20-200 weight parts per 100 weight parts of the starting rubber. Smaller amounts would invite ineffective reinforcement, and larger amounts would cause insufficient compatibility with a starting rubber.

In a second preferred embodiment of the invention, eligible starting rubbers include NR and IR combined with a selected, modified type of SBR.

Modified SBR is a rubber having at a selected position of the molecular chain at least one atomic group of formula (I):

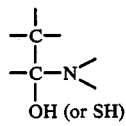

This molecular bonding may be effected by reacting unmodified styrene-butadiene copolymers with compounds containing a chemical bond of formula (II):

where M is an oxygen or sulfur atom.

Typical examples of compounds (II) include N,N-dimethylformamide, N,N-diethylformamide, N,N-diethylacetamide, aminoacetamide, N,N-dimethyl-N',N'-dimethylaminoacetamide, N-phenyldiacetamide, N,N-dimethylacrylamide, N,N-dimethylmethacrylamide, propionamide, N,N-dimethylpropionamide, 4-pyridylamide, N,N-dimethyl-4-pyridylamide, N,N-dimethylbenzamide, p-aminobenzamide, N',N'-(p-dimethylamino)-benzamide, N,N-dimethyl-N'-(p-ethylamino)benzamide, N-acetyl-N-2-naphthylbenzamide, nicotinamide, N,N-diethylnicotinamide, amide succinate, amide maleate, N,N,N',N'-tetramethylamide maleate, imide succinate, maleimide, N-methylmaleimide, N-methylphthalimide, 1,2-cyclohexanecarboxyimide, N-methyl-1,2-cyclohexanedicarboxyimide, oxamide, 2-furlamide, N,N,N',N'-tetramethyloxamide, N,N-dimethyl-2-furlamide, N,N-dimethyl-8-quinolinecarboxyamide, N,N-dimethyl-p-aminobenzylacetamide, N,N-dimethyl-N',N'-(p'-dimethylamino)cinnamylideneacetamide, N,N-dimethyl-N',N'-(2-dimethylamino)vinylamide, N'-(2-methylamino)vinylamide, urea, N,N'-dimethylurea, N,N,N',N'-tetramethylurea, methyl carbamate, N,N-diethylmethyl carbamate, ε-caprolactum, N-methyl-ε-caprolactum, 2-pyrrolidone, N-methyl-2-pyrrolidone, N-acetyl-2-pyrrolidone, 2-piperidone, N-methyl-2-piperidone, 2-quinolone, N-methyl-2-quinoline, 2-indolinone, N-methyl-2-indolinone, isocyanuric acid, N,N',N''-trimethylisocyanurate and the like, and their sulfur-containing compounds. Particularly preferred among compounds (II) are those having an alkyl group attached to the nitrogen atom.

Atomic group-bonded, modified SBR may be derived for example by a reaction in which styrene and butadiene are polymerized with use of an alkaline metal or alkaline earth metal catalyst, followed by addition of compound (II), or by a reaction in which a styrene-butadiene copolymer is dissolved in a suitable organic solvent and then added with compound (II) in the presence of a similar catalyst. Any commonly known solution-polymerization catalysts are suitable for the reactions. Alkaline metal catalysts include for example metals such as lithium, rubidium, cesium and the like, and their complexes with hydrocarbon or polar compounds, such as n-butyllithium, 2-naphthyllithium, potassium tetrahydrofuran, potassiumdiethoxyethane and the like. Alkaline earth metal catalysts are those predominantly of barium, strontium, calcium and the like as disclosed for instance in Japanese Patent Laid-Open Publication Nos. 51-115590, 52-9090 and 57-100146.

On completion of the reaction, the resulting unsaturated rubber-like polymer may be coagulated for example with methanol and separated from the reaction solution as by steam stripping, thereby providing a modified SBR contemplated under the second embodiment.

Modified SBR has one or more atomic groups (I) chemically bonded at selected positions of the molecular chain. Terminal bonding is particularly preferred because greater fuel economy is attributed to the use of a modified type of SBR resulting from reaction of a dienyl-terminated styrene-butadiene copolymer with compound (II). Modified SBR is more highLy rebound-resilient than unmodified SBR and hence adequately skid-resistant and fuel-saving with other important qualities held at an optimum level.

Modified SBR should have a styrene bond in the range of 10-30% by weight and a 1,2-vinyl bond in the range of 10-80% by weight. Smaller styrene bonds than 10% would fail to give sufficient resistance to wet skid. Larger styrene bonds than 30% would improve this quality, but lead to reduced resistance to snowy and icy skid and to abrasion. Modified SBR if smaller 1,2-vinyl bonds than 10% would be ineffective in improving snow and ice skid resistance and if larger 1,2-vinyl bonds than 80% would develop intense heat, resulting in reduced resistance to snowy and ice skid and to abrasive wear.

To facilitate processability, modified SBR may contain a tin-butadienyl branched polymer in any desired quantity.

The amount of modified SBR to be used should be in the range of 80-20 weight parts based on 20-80 weight parts of either one or both of NR and IR, totalling at 100 weight parts. Departures from this range would adversely affect fuel economy, wet antiskidding or snowy and icy antiskidding.

In the second embodiment, the starting rubber may be combined with diene rubbers in amounts not exceeding 30 weight parts. Specific examples include butadiene rubber, acrylonitrile-butadiene rubber, unmodified styrene-butadiene rubber and the like.

Carbon black specified above is equally applicable as such to the second embodiment but in an amount of 30-80 weight parts per 100 weight parts of the starting rubber. The filler if smaller amounts than 30 parts would induce inadequate wet antiskidding and unacceptable abrasion resistance and if larger amounts than 80 parts would result in a tire of insufficient fuel economy and excessive rigidity and hence severe skid on snow and ice.

Various other additives may also be employed which include vulcanizing agents, vulcanization accelerators, vulcanization activators, antioxidants, tackifiers, softeners and the like.

The following examples are provided for a better understanding of the present invention, but should not be regarded as limiting the invention. All formulations are in part by weight in these examples.

Examples 1–7 and Comparative Examples 1–13

Tests were made with use of carbon black shown in Table 1.

Different rubber compositions were prepared by kneading the components given in Table 2, except for sulfur and vulcanizing agent, for 4 minutes in a 1.7 liter Banbury mixer, followed by addition of the latter two materials on a roll. Vulcanization was effected at 160° C. for 15 minutes. The test compositions were examined for tensile stress at 300%, Lüpke rebound resilience, Akron abrasion and pico abrasion with the results given in Table 2. The smaller index, the lower Lüpke rebound resilience and hence rolling resistance. Pico abrasion was determined by the amount of wear, and the smaller index, the greater abrasion resistance.

The compositions according to the invention have now been found to provide a good balance of tensile stress, abrasion resistance and rebound resilience. Too large $D_{50}(Dst)$ revealed inadequate resistance to abrasive wear as seen from control carbon black, CB-5.

Examples 8–10 and Comparative Examples 14–16

Different rubber compositions were prepared with use of the same types of carbon black as shown in Table 1 and also of the components shown in Table 3. Kneading, rolling and vulcanization were conducted in a manner similar to the previous examples.

Details of modified SBR types tested were given below.

| Bonding (wt. %)*2 | SBR-1*1 | SBR-2*1 |
|---|---|---|
| styrene | 20 | 17 |
| 1,2-vinyl | 60 | 28 |

Notes:
*1 both rubbers having bonded in the molecular chain with an atomic group of the formula

*2 determined by H—NMR

Tensile stress at 300%, Lüpke rebound resilience, wet skid resistance and pico abrasion were examined with the results shown in Table 3. The smaller index in rebound resilience at 0° C., the higher resistance to wet skid.

The compositions embodying the invention are highly satisfactory in respect of rebound resilience with resistance to wet skid and to abrasion held at a high level. CB-1 and CB-2, given acceptable abrasion resistance, failed to improve rebound resilience at elevated temperature and wet skid.

Example 11 and Comparative Example 17

Two tires were produced to a size of 145 SR 12. The treads were fabricated respectively from the recipes of Example 10 and Comparative Example 15.

Rolling resistance was determined at a tire air pressure of 1.7 kg/cm² and at a speed of 60 kg/hr on a steel drum of 1,707 mm diameter and with the results shown in Table 4. This resistance was adjudged with the control tire taken as an index of 100. The smaller index, the lower rolling resistance and the higher fuel saving.

TABLE 1

| Carbon black | C | | I | | C |
|---|---|---|---|---|---|
| I: inventive | CB-1 | | | | |
| C: comparative | (N339) | CB-2 | CB-3 | CB-4 | CB-5 |
| IA (mg/g)*(1) | 92 | 80 | 66 | 63 | 70 |
| N₂SA (m²/g)*(2) | 93 | 85 | 82 | 77 | 83 |
| N₂SA/IA | 1.06 | 1.06 | 1.24 | 1.22 | 1.19 |
| ΔD₅₀ (Dst) (mµ)*(3) | 71 | 93 | 92 | 84 | 190 |

Notes:
*(1)JIS K-6221 was followed.
*(2)JIS K-6221 was followed.
*(3)Measurement was made using a disc centrifuge (Joyce Loebl, England). Carbon black was precise-weighed and added with an aqueous solution containing 20% by volume of ethanol and a surfactant, followed by dispersion with ultrasonic wave to a concentration of 5 mg/100 cc. The resulting test solution 0.5 ml was centrifugally precipitated while being charged into a distilled water-containing spinning solution 10 ml on the centrifuge rotating at 8,000 rpm. ΔD₅₀ (Dst) was obtained by drawing an agglomerate distribution curve from Stokes' diameter by photometric precipitation and subsequently by halving the maximum absorbance on the histogram.

TABLE 2

| Formulation | Comparative Examples 1 | Comparative Examples 2 | Example 1 | Comparative Examples 3 | Comparative Examples 4 | Examples 2 | Examples 3 | Comparative Examples 5 | Comparative Examples 6 | Comparative Examples 7 | Example 4 |
|---|---|---|---|---|---|---|---|---|---|---|---|
| NR*(1) | 100 | 100 | 100 | | | | | | | | |
| SBR-1*(2) | | | | 100 | 100 | 100 | 100 | 100 | | | |
| SBR-2*(3) | | | | | | | | | 100 | 100 | 100 |
| BR-1*(4) | | | | | | | | | | | |
| CB-1 | 45 | | | 50 | | | | | 50 | | |
| CB-2 | | 45 | | | 50 | | | | | 50 | |
| CB-3 | | | 45 | | | 50 | | | | | 50 |
| CB-4 | | | | | | | 50 | | | | |
| CB-5 | | | | | | | | 50 | | | |
| ZnO | 5 | 5 | 5 | 3 | 3 | 3 | 3 | 3 | 3 | 3 | 3 |
| stearic acid | 3 | 3 | 3 | 1 | 1 | 1 | 1 | 1 | 1 | 1 | 1 |
| antioxidant*(5) | 1.5 | 1.5 | 1.5 | 1.5 | 1.5 | 1.5 | 1.5 | 1.5 | 1.5 | 1.5 | 1.5 |
| wax | 0.5 | 0.5 | 0.5 | 0.5 | 0.5 | 0.5 | 0.5 | 0.5 | 0.5 | 0.5 | 0.5 |
| oil | 6 | 6 | 6 | | | | | | 5 | 5 | 5 |
| accelerator OBS*(6) | 0.8 | 0.8 | 0.8 | | | | | | | | |
| accelerator NZ*(7) | | | | 1.0 | 1.0 | 1.0 | 1.0 | 1.0 | 1.0 | 1.0 | 1.0 |

TABLE 2-continued

| | | | | | | | | | | | |
|---|---|---|---|---|---|---|---|---|---|---|---|
| sulfur | 2.00 | 2.00 | 2.00 | 1.75 | 1.75 | 1.75 | 1.75 | 1.75 | 1.75 | 1.75 | 1.75 |
| 300% tensile stress (kg/cm$^2$) | 161 | 159 | 169 | 209 | 211 | 220 | 213 | 217 | 121 | 133 | 138 |
| Lupke rebound resilience (%, 60° C.) | 68 | 70 | 71 | 60 | 62 | 64 | 63 | 63 | 60 | 63 | 67 |
| Arkon abrasion (cc) | 0.33 | 0.34 | 0.31 | 0.35 | 0.36 | 0.32 | 0.34 | 0.36 | | | |
| pico abrasion (cc × 10$^{-3}$) | | | | | | | | | 31 | 31 | 30 |

| Formulation | Comparative Examples 8 | Comparative Examples 9 | Example 5 | Comparative Examples 10 | Comparative Examples 11 | Example 6 | Comparative Example 12 | Example 7 | Comparative Example 13 | Example 8 |
|---|---|---|---|---|---|---|---|---|---|---|
| NR*$^{(1)}$ | | | | 50 | 50 | 50 | | | | |
| SBR-1*$^{(2)}$ | | | | 50 | 50 | 50 | 50 | 50 | 70 | 70 |
| SBR-2*$^{(3)}$ | | | | | | | 50 | 50 | | |
| BR-1*$^{(4)}$ | 100 | 100 | 100 | | | | | | 30 | 30 |
| CB-1 | 50 | | | 50 | | | 50 | | 50 | |
| CB-2 | | 50 | | | 50 | | | | | |
| CB-3 | | | 50 | | | 50 | | 50 | | 50 |
| CB-4 | | | | | | | | | | |
| CB-5 | | | | | | | | | | |
| ZnO | 3 | 3 | 3 | 3 | 3 | 3 | 3 | 3 | 3 | 3 |
| stearic acid | 1 | 1 | 1 | 1 | 1 | 1 | 1 | 1 | 1 | 1 |
| antioxidant*$^{(5)}$ | 1.5 | 1.5 | 1.5 | 1.5 | 1.5 | 1.5 | 1.5 | 1.5 | 1.5 | 1.5 |
| wax | 0.5 | 0.5 | 0.5 | 0.5 | 0.5 | 0.5 | 0.5 | 0.5 | 0.5 | 0.5 |
| oil | 5 | 5 | 5 | 5 | 5 | 5 | 5 | 5 | 5 | 5 |
| accelerator OBS*$^{(6)}$ | | | | | | | | | | |
| accelerator NZ*$^{(7)}$ | 1.0 | 1.0 | 1.0 | 1.0 | 1.0 | 1.0 | 1.0 | 1.0 | 1.0 | 1.0 |
| sulfur | 1.75 | 1.75 | 1.75 | 1.75 | 1.75 | 1.75 | 1.75 | 1.75 | 1.75 | 1.75 |
| 300% tensile stress (kg/cm$^2$) | 100 | 98 | 102 | 152 | 159 | 163 | 130 | 139 | 115 | 120 |
| Lupke rebound resilience (%, 60° C.) | 62 | 63 | 64 | 60 | 61 | 63 | 57 | 61 | 58 | 62 |
| Akron abrasion (cc) | | | | | | | | | | |
| pico abrasion (cc × 10$^{-3}$) | 8 | 6 | 5 | 25 | 26 | 24 | 25 | 24 | 17 | 16 |

Notes:
*$^{(1)}$RSS No. 1
*$^{(2)}$Nipol 1502, Nippon Zeon Co., Ltd.
*$^{(3)}$Solprene 1204, Asahi Chemical Industries Co., Ltd.
*$^{(4)}$Diene NF, Asahi Chemical Industries Co., Ltd.
*$^{(5)}$Nocceller 6C, Ohuchi Shinko Chemical Industries, Ltd.
*$^{(6)}$Nocceller MSA, Ohuchi Shinko Chemical Industries, Ltd.
*$^{(7)}$Nocceller NS, Ohuchi Shinko Chemical Industries, Ltd.

TABLE 3

| Formulation | Comparative Example 14 | Example 15 | Comparative Example 8 | Comparative Example 16 | Examples 9 | Examples 10 |
|---|---|---|---|---|---|---|
| NR | 50 | 50 | 50 | 45 | 45 | 45 |
| SBR-1 | 25 | 25 | 25 | 30 | 30 | 30 |
| SBR-2 | 25 | 25 | 25 | 25 | 25 | 25 |
| CB-1 | 50 | | | | | |
| CB-2 | | 50 | | 50 | | |
| CB-3 | | | 50 | | 50 | |
| CB-4 | | | | | | 50 |
| ZnO | 3 | 3 | 3 | 3 | 3 | 3 |
| stearic acid | 2 | 2 | 2 | 2 | 2 | 2 |
| wax | 1 | 1 | 1 | 1 | 1 | 1 |
| antioxidant*$^{(1)}$ | 1.5 | 1.5 | 1.5 | 1.5 | 1.5 | 1.5 |
| oil | 5 | 5 | 5 | 5 | 5 | 5 |
| sulfur | 1.75 | 1.75 | 1.75 | 1.75 | 1.75 | 1.75 |
| accelerator NS*$^{(2)}$ | 1.0 | 1.0 | 1.0 | 1.0 | 1.0 | 1.0 |
| 300% tensile stress (kg/cm$^2$) | 147 | 144 | 147 | 140 | 142 | 140 |
| Lupke rebound resilience (%) | | | | | | |
| 60° C. | 65 | 66 | 69 | 66 | 69 | 69 |
| 0° C. | 37 | 40 | 40 | 38 | 38 | 38 |
| wet skid resistance | 81 | 81 | 81 | 82 | 84 | 83 |
| pico abrasion (μl) | 25 | 26 | 24 | 26 | 24 | 25 |

Notes:
*$^{(1)}$Santoflex 13
*$^{(2)}$Nocceller NS

TABLE 4

| Tread rubber | Comparative Example 17 | Example 11 |
| --- | --- | --- |
| rolling resistance | 100 | 95 |

What is claimed is:
1. A rubber composition comprising:
(a) a starting rubber comprising from 20 to 80 parts by weight of at least one rubber selected from the group consisting of natural rubber and synthetic polyisoprene rubber, and from 80 to 20 parts by weight of styrene-butadiene rubber having a styrene content of 10 to 30 percent by weight and a 1,2-vinyl bond content of from 10 to 80 percent by weight, said styrene-butadiene rubber containing either in the molecular chain or at the terminal end thereof at least one atomic group of the formula

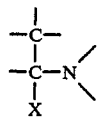

wherein X is OH or SH, the total amount of said starting rubber being 100 parts by weight; and
(b) from 30 to 80 parts by weight of carbon black per 100 parts of starting rubber, said carbon black having an iodine adsorption of from 60 to 70 mg/g, a specific surface area ratio of nitrogen adsorption to iodine adsorption of from 1.18 to 1.40 and a median width of Stokes' particle size distribution of from 70 to 130 millimicrons.

2. The rubber composition of claim 1 wherein said styrene-butadiene rubber is a modified rubber derived from reaction of an unmodified styrene-butadiene copolymer with a compound containing a bond of the formula

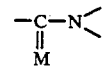

where M is an oxygen or sulfur atom.

3. The rubber composition of claim 2 wherein said compound is N,N-dimethylformaldehyde, N,N-diethylformaldehyde, N,N-diethylacetamide, aminoacetamide, N,N-dimethyl-N',N'-dimethylaminoacetamide, N-phenyldiacetamide, N,N-dimethyl-acrylamide, N,N-dimethylmethacrylamide, pripionamide, N,N-dimethylpropionamide, 4-pyridylamide, N,N-dimethyl-4-pyridylamide, N,N-dimethylbenzamide, p-aminobenzamide, N',N'-(p-dimethylamino)benzamide, N,N-dimethyl-N'-(p-ethylamino)benzamide, N-acetyl-N-2-naphthylbenzamide, nicotinamide, N,N-diethylnicotinamide, amide succinate, amide maleate, N,N,N',N'-tetramethylamide maleate, imide succinate, maleimide, N-methylmaleimide, N-methylphthalimide, 1,2-cyclohexanecarboxyimide, N-methyl-1,2-cyclohexanedicarboxyimide, oxamide, 2-furlamide, N,N,N',N'-tetramethyloxamide, N,N-dimethyl-2-furlamide, N,N-dimethyl-8-quinolinecarboxyamide, N,N-dimethyl-p-amino-benzylacetamide, N,N-dimethyl-N',N'-(p'-dimethylamino)cinnamylideneacetamide, N,N-dimethyl-N',N'-(2-dimethylamino)vinylamide, N'-(2-methylamino)vinylamide, urea, N,N'-dimethylurea, N,N,N',N'-tetramethylurea, methyl carbamate, N,N-diethylmethyl carbamate, ε-caprolactum, N-methyl-ε-caprolactum, 2-pyrrolidone, N-methyl-2-pyrrolidone, N-acetyl-2-pyrrolidone, 2-piperidone, N-methyl-2-piperidone, 2-quinolone, N-methyl-2-quinolone, 2-indolinone, N-methyl-2-indolinone, isocyanuric acid or N,N',N''-trimethylisocyanurate, or a sulfur-containing compound thereof.

4. The rubber composition of claim 1 wherein said styrene-butadiene rubber further includes a tin-butadienyl branched polymer.

* * * * *

UNITED STATES PATENT AND TRADEMARK OFFICE
CERTIFICATE OF CORRECTION

PATENT NO. : 4,822,844

DATED : April 18, 1989

INVENTOR(S) : Kinya Kawakami and Takao Muraki

It is certified that error appears in the above-identified patent and that said Letters Patent is hereby corrected as shown below:

Claim 3, line 8: change "N,N'dimethylformaldehyde" to --N,N-dimethylformamide--; and Claim 3, line 9, change "formaldehyde" to --formamide--.

Signed and Sealed this

Twenty-seventh Day of February, 1990

*Attest:*

JEFFREY M. SAMUELS

*Attesting Officer*   *Acting Commissioner of Patents and Trademarks*